(12) United States Patent
Ragupathi et al.

(10) Patent No.: US 10,069,682 B2
(45) Date of Patent: Sep. 4, 2018

(54) SYSTEMS AND METHODS FOR PROACTIVELY RECOMMENDING INPUT/OUTPUT REDIRECTION USING MANAGEMENT CONTROLLER

(71) Applicant: Dell Products L.P., Round Rock, TX (US)

(72) Inventors: Dinesh Kunnathur Ragupathi, Round Rock, TX (US); Timothy M. Lambert, Austin, TX (US); Syama Poluri, Round Rock, TX (US); Manjunath Am, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 118 days.

(21) Appl. No.: 14/997,169

(22) Filed: Jan. 15, 2016

(65) Prior Publication Data

US 2017/0207964 A1 Jul. 20, 2017

(51) Int. Cl.
*H04L 29/04* (2006.01)
*H04L 12/24* (2006.01)
*H04L 12/26* (2006.01)

(52) U.S. Cl.
CPC .......... *H04L 41/0816* (2013.01); *H04L 43/06* (2013.01); *H04L 43/50* (2013.01)

(58) Field of Classification Search
CPC ...... H04L 41/0816; H04L 43/06; H04L 43/50
See application file for complete search history.

(56) References Cited

U.S. PATENT DOCUMENTS

| | | | | |
|---|---|---|---|---|
| 8,958,293 | B1* | 2/2015 | Anderson | H04L 67/1002 370/230 |
| 9,344,493 | B1* | 5/2016 | Anand | H04L 67/2861 |
| 2001/0049732 | A1* | 12/2001 | Raciborski | G06F 17/30864 709/224 |
| 2010/0080144 | A1* | 4/2010 | Greenberg | H04L 12/1863 370/253 |
| 2011/0314119 | A1* | 12/2011 | Kakadia | H04L 29/12066 709/213 |
| 2015/0156902 | A1 | 6/2015 | Terwilliger et al. | |
| 2015/0281016 | A1* | 10/2015 | Guerin | H04L 67/1008 709/224 |

* cited by examiner

*Primary Examiner* — Scott B Christensen
(74) *Attorney, Agent, or Firm* — Jackson Walker L.L.P.

(57) ABSTRACT

In accordance with embodiments of the present disclosure, an information handling system may include a plurality of information handling resources a controller communicatively coupled to the plurality of information handling resources, and a software-based controller. The controller may be configured to monitor for environmental factors associated with the plurality of information handling resources, calculate a health ranking of the plurality of information handling resources based on the environmental factors, and communicate the health ranking to a software-based controller for managing communication to the information handling resources. The software-based controller may include executable instructions configured to, when read and executed by a processor, redirect communication associated with the plurality of information handling resources based on the health ranking.

19 Claims, 2 Drawing Sheets

SYSTEMS AND METHODS FOR PROACTIVELY RECOMMENDING INPUT/OUTPUT REDIRECTION USING MANAGEMENT CONTROLLER

TECHNICAL FIELD

The present disclosure relates in general to information handling systems, and more particularly to systems and methods for providing for a proactively recommending input/output redirection in an information handling system based on environmental factors and using a management controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many instances, software-defined storage (SDS) may be used to manage storage resources associated with one or more information handling systems. As its name implies, SDS is a software-based approach for managing policy-based provisioning and management of data storage independent of the underlying storage hardware. SDS implementations may include a form of storage virtualization to separate the storage hardware from the SDS software that manages the storage infrastructure. The software enabling an SDS environment may also provide policy management for feature options such as deduplication, replication, thin provisioning, snapshots and backup.

In current SDS implementations, when a physical storage resource (e.g., disk drive) fails, SDS controllers may determine other physical storage resources for redirection of input/output (I/O) operations based on SDS policies. For example, SDS controllers may access in-band Self-Monitoring, Analysis and Reporting Technology (SMART) information communicated to an operating system from the physical storage resources themselves in order to perform redirection for failed drives or drives indicating an imminent failure. However, traditional SDS is limited in that it does not have access to other data (e.g., thermal airflow escape, reliability, ambient temperature, vibration information, etc.) that might be useful in selecting a most suitable physical storage resource for I/O redirection.

SUMMARY

In accordance with the teachings of the present disclosure, the disadvantages and problems associated with effective I/O redirection in an information handling system may be reduced or eliminated.

In accordance with embodiments of the present disclosure, an information handling system may include a plurality of information handling resources a controller communicatively coupled to the plurality of information handling resources, and a software-based controller. The controller may be configured to monitor for environmental factors associated with the plurality of information handling resources, calculate a health ranking of the plurality of information handling resources based on the environmental factors, and communicate the health ranking to a software-based controller for managing communication to the information handling resources. The software-based controller may include executable instructions configured to, when read and executed by a processor, redirect communication associated with the plurality of information handling resources based on the health ranking.

In accordance with these and other embodiments of the present disclosure, a method may include receiving a health ranking of a plurality of information handling resources of an information handling system from a management controller of the information handling system, the health ranking calculated by the management controller based on environmental factors associated with the plurality of information handling resources, and redirecting communication associated with the plurality of information handling resources based on the health ranking.

In accordance with these and other embodiments of the present disclosure, an article of manufacture may include a non-transitory computer-readable medium computer-executable instructions carried on the computer-readable medium, the instructions readable by a processor. The instructions, when read and executed, may cause the processor to: (a) receive a health ranking of a plurality of information handling resources of an information handling system from a management controller of the information handling system, the health ranking calculated by the management controller based on environmental factors associated with the plurality of information handling resources; and (b) redirect communication associated with the plurality of information handling resources based on the health ranking.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
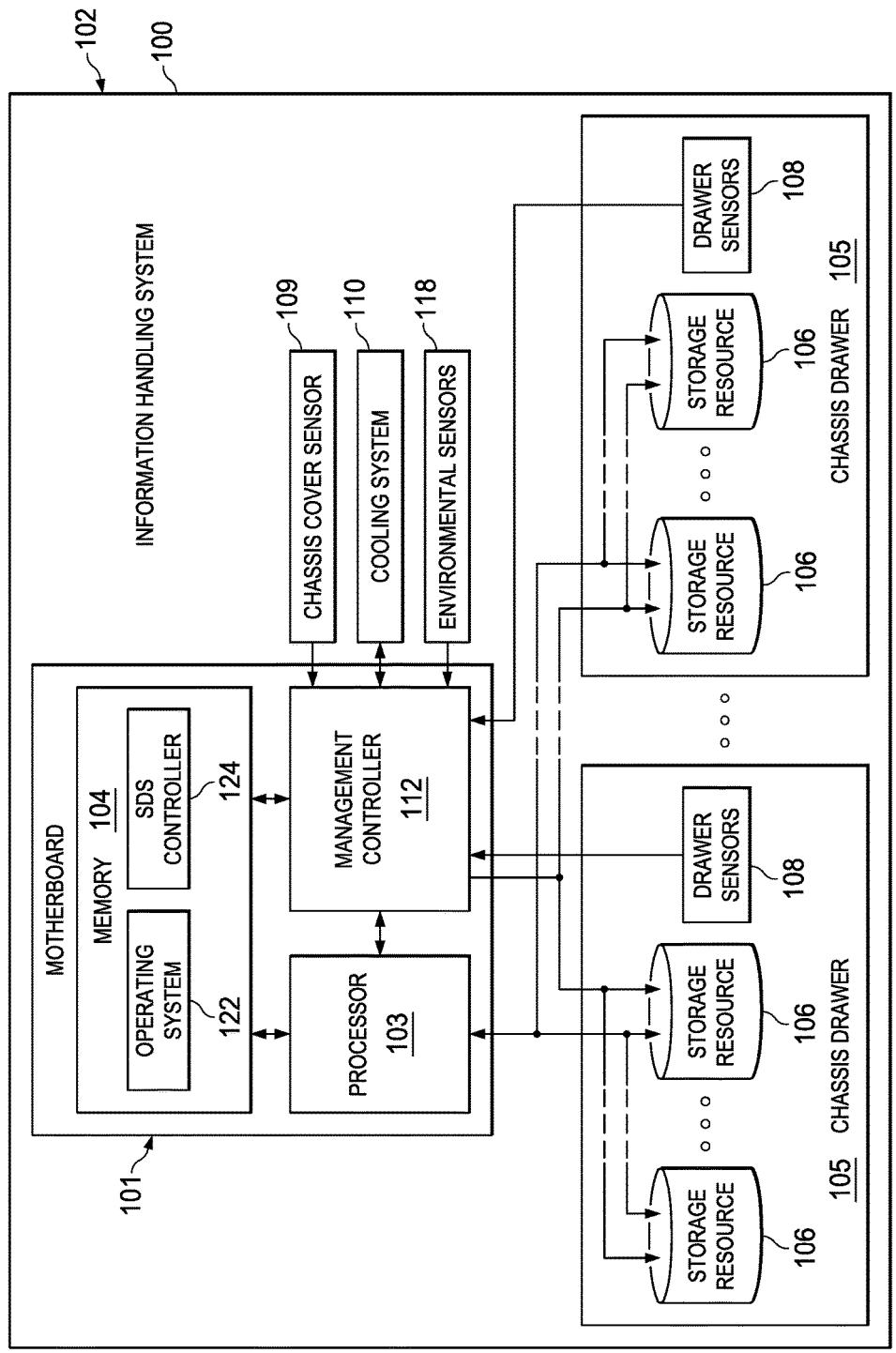
FIG. 1 illustrates a block diagram of selected components of an example information handling system, in accordance with embodiments of the present disclosure.
Figure 2:
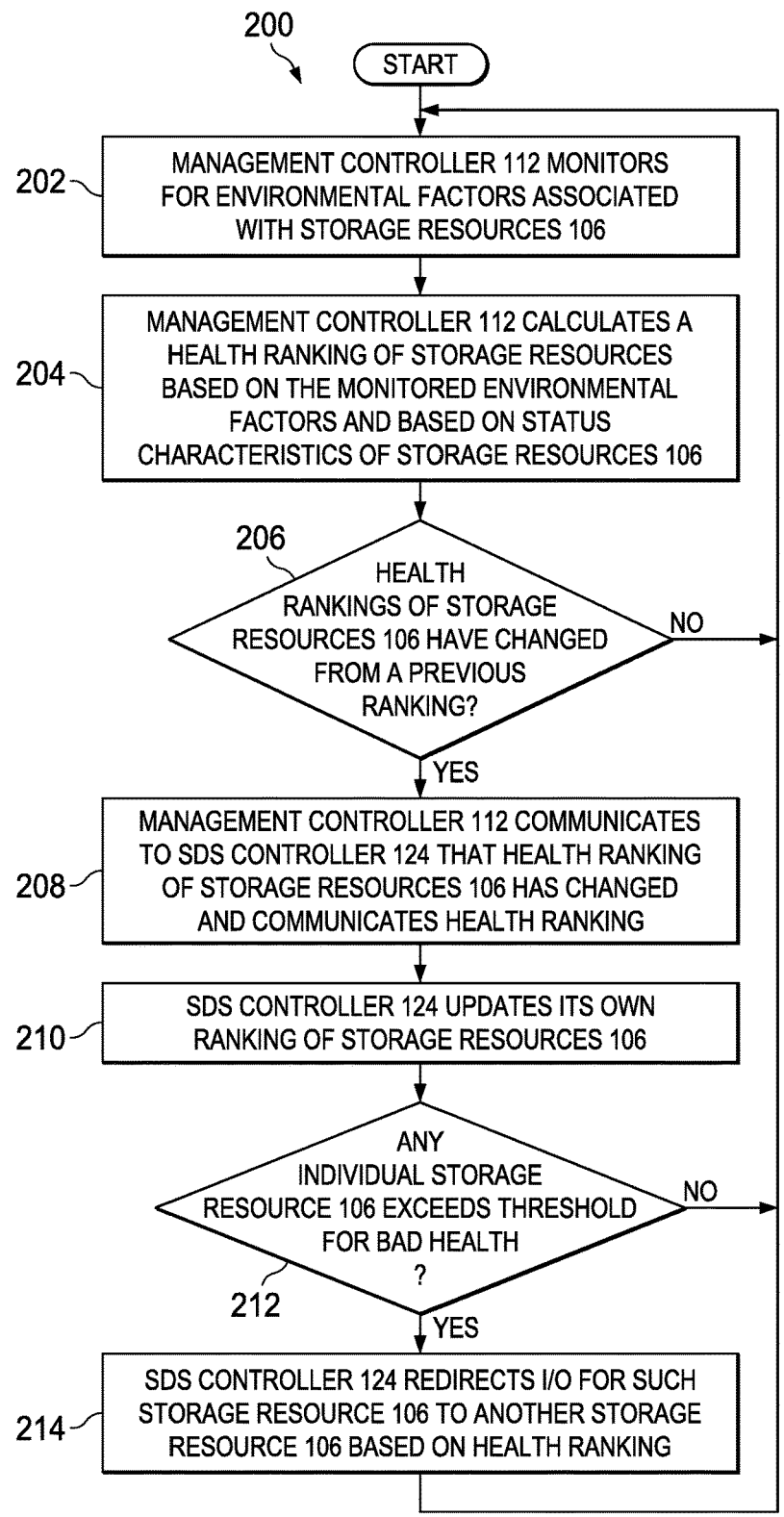
FIG. 2 illustrates a flow chart of an example method for proactively recommending input/output redirection using a management controller, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102 including functionality for providing user-visible thermal performance degradation monitoring. In some embodiments, information handling system 102 may comprise a server. In other embodiments, information handling system 102 may be a personal computer (e.g., a desktop computer, a laptop, notebook, tablet, handheld, smart phone, personal digital assistant, etc.). In yet other embodiments, information handling system 102 may comprise a storage enclosure.

As shown in FIG. 1, information handling system 102 may include a chassis 100 housing a motherboard 101, a plurality of storage resources 106 carried in chassis drawers 105, a plurality of drawer sensors 108, a chassis cover sensor 109, a cooling system 110, and one or more environmental sensors 118.

Chassis 100 may be an enclosure that serves as a container for various information handling systems and information handling resources, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of information handling systems and/or information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, a memory 104, and a management controller 112 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a storage resource 106, memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 122. Operating system 122 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 122. Active portions of operating system 122 may be transferred to memory 104 for execution by processor 103. Although operating system 122 is shown in FIG. 1 as stored in memory 104, in some embodiments operating system 122 may be stored in storage media accessible to processor 103, and active portions of operating system 122 may be transferred from such storage media to memory 104 for execution by processor 103.

Also as shown in FIG. 1, memory 104 may have stored thereon SDS controller 124. SDS controller 124 may comprise any program of executable instructions, or aggregation of programs of executable instructions, configured to manage and/or control storage resources 106. For example, SDS controller 124 may perform managing policy-based provisioning and management of data storage independent of the underlying storage resources 106. In operation, SDS controller 124 may be able to receive SMART information from storage resources 106 and health ranking information of storage resources 106 from management controller 112 (as described in greater detail below) such that SDS controller 124 may use such ranking information in order to determine redirection of I/O from unhealthy storage resources 106 to healthy storage resources 106.

A management controller 112 may be communicatively coupled to processor 103 and memory 104 and may comprise any system, device, or apparatus configured to facilitate management and/or control of components of information handling system 102, information handling systems modularly coupled within, and/or one or more of its component information handling resources. Management controller 112 may be configured to issue commands and/or other signals to manage and/or control information handling resources of information handling system 102. Management controller 112 may comprise a microprocessor, microcontroller, DSP, ASIC, field programmable gate array ("FPGA"), EEPROM, or any combination thereof.

In addition or alternatively, management controller 112 may also provide a management console for user/administrator access to these functions. For example, management controller 112 may provide for communication with a user interface, permitting a user to interact with management controller 112 and configure control and management of components of information handling system 102 by management controller 112. As another example, management controller 112 may act as a proxy and establish communication between two information handling resources by either configuring them to directly couple to each other or transfer information by receiving information from one information handling resource, processing the information if needed, and then transferring the information to the other information handling resource. As a further example, management controller 112 may implement Web Services Management ("WS-MAN") or another suitable management protocol permitting a user to remotely access a management controller 112 to configure information handling system 102 and its various information handling resources. In such embodiments, management controller 112 may interface with a network interface separate from a traditional network interface of information handling system 102, thus allowing for "out-of-band" control of information handling system 102, such that communications to and from management controller 112 are communicated via a management channel physically isolated from an "in band" communication channel with the traditional network interface. Thus, for example, if a failure occurs in information handling system 102 that prevents an administrator from interfacing with information handling system 102 via a traditional network interface and/or user interface (e.g., operating system failure, power failure, etc.), the administrator may still be able to monitor and/or manage information handling system 102 (e.g., to diagnose problems that may have caused failure) via management controller 112. In the same or alternative embodiments, management controller 112 may allow an administrator to remotely manage one or more parameters associated with operation of information handling system 102 and its various information handling resources (e.g., power usage, processor allocation, memory allocation, security privileges, etc.). In certain embodiments, management controller 112 may include or may be an integral part of a chassis management controller (CMC), a baseboard management controller (BMC), a Dell Remote Management controller (DRAC), an Integrated Dell Remote Management controller (iDRAC), or an enclosure controller (EC). In these and other embodiments, management controller 112 may also be referred to as an access controller or a life-cycle controller.

As described in greater detail below, management controller 112 may also be configured to, based on telemetry data (e.g., from drawer sensors 108, chassis cover sensor 109, cooling system 110, environmental sensors 118) and known characteristics of information handling resources (e.g., storage resources 106), provide a dynamic thermal excursion timeout determination and predictive failure notification on an information handling resource by information handling resource (e.g., storage resource 106 by storage resource 106) basis, in accordance with systems and methods set forth in U.S. patent application Ser. No. 14/823,521 entitled "Systems and Methods for Dynamic Thermal Excursion Timeout Determination and Predictive Failure Notification Based on Airflow Escape Detection," filed Aug. 11, 2015 (the '521 application) and assigned to the assignee of the present application. The '521 application is incorporated herein by reference.

In addition, management controller 112 may also be configured to, based on telemetry data (e.g., from drawer sensors 108, chassis cover sensor 109, cooling system 110, environmental sensors 118) and known characteristics of information handling resources (e.g., storage resources 106), perform a relative ranking of health of information handling resources on an information handling resource by information handling resource (e.g., storage resource 106 by storage resource 106) basis. For storage resources 106, such health ranking may suggest an indication of storage resources 106 that may be best suited for redirection of I/O from storage resources predicted to have an imminent failure. As described above, such health ranking information may be communicated to SDS controller 124 in order to allow SDS controller 124 to use such ranking information to determine redirection of I/O from unhealthy storage resources 106 to healthy storage resources 106.

In order to perform such prediction and/or ranking, management controller 112 may have stored thereon or stored in a computer-readable medium accessible to management controller 112, any suitable information regarding thermal characteristics of information handling resources of information handling system 102. For example, in some embodiments, such thermal data may include information that may be used by management controller 112 to, for an individual storage resource 106, calculate a thermal excursion timeout for such individual storage resource 106 based on the type of storage resource 106, physical location of the storage resource within information handling system 102, the temperatures present in information handling system 102 (e.g., as sensed by a temperature sensor with environmental sensors 118), the speed of a motor for moving a cooling fluid provided by cooling system 110, information from drawer sensors 108 and chassis cover sensor 109, or other factors. Thus, such thermal data may include information characterizing, for each of one or more types of storage resources 106, its thermal performance in response to such factors.

A chassis drawer 105 may comprise any suitable structural and/or mechanical system, device, or apparatus for receiving and/or carrying modular information handling resources, such as storage resources 106, for example. For example, as described in greater detail in the '521 application, a chassis drawer 105 may be translated by a user between an open and closed position, such that in the open position, a user may service (e.g., remove and/or replace) individual modular information handling resources (e.g., storage resources 106) disposed therein.

Storage resources 106 may be communicatively coupled to processor 103, and may include any system, device, or apparatus configured to retain program instructions and/or data for a period of time (e.g., computer-readable media). Storage resources 106 may include hard disk drives, magnetic tape libraries, optical disk drives, magneto-optical disk drives, compact disk drives, compact disk arrays, disk array controllers, and/or any other system, apparatus or device operable to store media. As shown in FIG. 1, storage resources 106 may be communicatively coupled to management controller 112. In some embodiments, some of such communicative coupling may be via a sideband interface of management controller 112 and/or a storage controller (e.g., a PowerEdge RAID Controller, manufactured and sold by Dell Inc.). In these and other embodiments, some of such communicative coupling may be via a management interface between management controller 112 and storage resources 106, such as an Inter-Integrated Circuit (I2C), Peripheral Component Interconnect Express (PCIe) bus using vendor-defined messages, and/or other suitable communications channel.

A drawer sensor 108 may be communicatively coupled to management controller 112 and may comprise any electronic system, device, or apparatus configured to generate an electrical or electronic signal indicative of a position of an associated chassis drawer 105. Examples of drawer sensors 108 may include Hall effect or other magnetic sensors, optoelectronic sensors, electrical contact sensors, or other suitable sensors. In some embodiments, each chassis drawer 105 may have a plurality of sensors 108, wherein each such drawer sensor 108 is configured to determine whether the drawer sensor 108 is inside or outside of chassis 100. Accordingly, in such embodiments, drawer sensors 108 may enable management controller 112 to determine not only whether a chassis drawer 105 is in an open or closed position, but also the degree of which chassis drawer 105 is opened when open. In other embodiments, drawer sensors 108 may not reside on chassis drawer 105, but may reside in a slot of chassis 100 for receiving a chassis drawer 105, in which case drawer sensors 108 may indicate the degree of openness of chassis drawer 105 based on whether a portion of chassis drawer 105 is proximate to individual drawer sensors 108.

Chassis cover sensor 109 may be communicatively coupled to management controller 112 and may comprise any electronic system, device, or apparatus configured to generate an electrical or electronic signal indicative of whether a cover of chassis 100 has been removed. Examples of chassis drawer sensor 109 may include a Hall effect or other magnetic sensor, optoelectronic sensor, electrical contact sensor, or other suitable sensor.

Cooling system 110 may be communicatively coupled to management controller 112, and may include any mechanical or electro-mechanical system, apparatus, or device operable to move coolant (e.g., air, other gases, liquids) throughout a chassis 100 of information handling system 102. In some embodiments, cooling system 110 may comprise a fan (e.g., a rotating arrangement of vanes or blades which act on a gaseous coolant such as air). In other embodiments, cooling system 110 may comprise a blower (e.g., a centrifugal fan that employs rotating impellers to accelerate gaseous coolant received at its intake and change the direction of the airflow). In operation, in the case of a cooling system 110 including an air mover (e.g., fan or blower), the air mover may cool information handling resources of information handling system 102 by drawing cool air into chassis 100 from outside of chassis 100, expel warm air from inside chassis 100 to the outside of chassis 100, and/or move air across one or more heatsinks (not explicitly shown) internal to chassis 100 to cool one or more information handling resources.

In other embodiments, cooling system 110 may comprise mechanisms other than a fan or blower for moving coolant, including liquid pumps, jets, and/or free convection enclosures.

Environmental sensors 118 may comprise one or more sensors configured to detect a physical quantity associated with information handling system 102 or an information handling resource thereof, and communicate to management controller 112 a signal indicative of such detected physical quantity. For example, environmental sensors 118 may comprise one or more of a temperature sensor, a thermal airflow sensor, a humidity sensor, a vibration sensor, and/or other sensor.

In addition to motherboard 101, processor 103, memory 104, storage resources 106, management controller 112, drawer sensors 108, chassis cover sensor 109, cooling system 110, and environmental sensors 118, information handling system 102 may include one or more other information handling resources.

Also, for purposes of clarity and exposition, FIG. 1 depicts only a single information handling system 102. However, in certain embodiments, a larger system may comprise a plurality of information handling systems 102 each being managed by an SDS controller 124 distributed across the plurality of information handling systems 102 or an SDS controller 124 executing on a single information handling system 102 and managing storage resources 106 of all such information handling systems 102.

FIG. 2 illustrates a flow chart of an example method 200 for proactively recommending input/output redirection using management controller 112, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 112 may monitor for environmental factors associated with storage resources 106. Such environmental factors may include, without limitation, temperature information, thermal airflow information (e.g., speeds of motors of a motor for moving a cooling fluid provided by cooling system 110), airflow escape information (e.g., based on information from chassis cover sensor 109 and/or drawer sensors 108), humidity information, vibration information, a physical location of storage resources 106 within information handling system 102, size of storage resources 106, etc.

At step 204, management controller 112 may calculate a health ranking of storage resources based on the monitored environmental factors. In some embodiments, the health ranking may also be based on status characteristics of storage resources 106 and/or identity characteristics of storage resources 106. For example, status characteristics of a storage resource 106 may include status information that may be reported by a storage resource 106 (e.g., a Non-Volatile Memory Express (NVMe) solid-state storage device) to management controller 112 such as whether the storage resource has an available spare, the percentage of the storage resource 106 used, a remaining rated endurance of the storage resource 106, a critical temperature threshold of the storage resource 106, and a predictive failure indicator of the storage resource 106. As another example, identity characteristics of a storage resource 106 may include information about a type of storage resource 106 (e.g., traditional rotating media, solid-state storage device, etc.), a model number of a storage resource 106, or a location of a storage resource 106 (e.g., a slot in which a storage resource 106 is populated).

In some embodiments, SDS controller 124 may communicate to management controller 112 which of the various parameters of the environmental factors, status characteristics, and/or identity characteristics that are to be used by management controller 112 in calculating the health ranking. In some of such embodiments, SDS controller 124 may define weights and/or priorities for the various parameters to be used by management controller 112 in calculating the health ranking.

At step 206, management controller 112 may determine whether the health rankings of the storage resources 106 have changed from a previous ranking of the storage resources 106. If the health rankings have not changed, method 200 may proceed again to step 202. Otherwise, method 200 may proceed to step 208.

At step 208, in response to a change in the health ranking, management controller 112 may communicate (e.g., via Intelligent Platform Management Interface command or other suitable command) to SDS controller 124 (which may be monitoring for events from management controller 112) that the health ranking of storage resources 106 has changed and may also communicate such health ranking. In some embodiments, in addition to communicating an indication that health rankings have changed, management controller 112 may also detect an imminent failure or other hazard condition (e.g., as set forth in the '521 application) and communicate an indication of such imminent failure to SDS controller 124.

At step 210, in response to receiving the updated health ranking from management controller 112, SDS controller 124 may update its own ranking of storage resources 106.

At step 212, SDS controller 124 may, based on the received health ranking information, determine if the health of any individual storage resource 106 has exceeded a threshold for bad health. If the health of an individual storage resource 106 has exceeded a threshold for bad health, method 200 may proceed to step 214. Otherwise, method 200 may proceed again to step 202.

At step 214, in response to determining that the health of an individual storage resource 106 has exceeded a threshold for bad health, SDS controller 124 may redirect I/O for such storage resource 106 to another storage resource 106 based on the health ranking. For example, in some embodiments, SDS controller 124 may redirect I/O to a storage resource 106 indicated by the health ranking to have the best health. After completion of step 214, method 200 may proceed again to step 202.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Although the foregoing discussion describes systems and methods for proactively recommending I/O redirection for storage resources 106, systems and methods identical or similar to those described herein may be applied to selection and/or redirection of communication to and from information handling resources other than storage resources.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
 a plurality of physical storage resources; and
 a management controller communicatively coupled to the plurality of physical storage resources and configured to:
  monitor for environmental factors associated with the plurality of physical storage resources, wherein the environmental factors include environmental factors relating to temperature;
  calculate a health ranking of the plurality of physical storage resources based on the environmental factors, wherein the health ranking includes a predictive indication of failure; and
  communicate the health ranking from the management controller to a software-based controller of the information handling system configured to manage communication between the information handling system and the physical storage resources;
 wherein the information handling system further comprises the software-based controller, the software-based controller comprising executable instructions configured to, when read and executed by a processor, redirect communication associated with the plurality of physical storage resources based on the health ranking such that communication is redirected away from physical storage resources that have been predicted to fail.

2. The information handling system of claim 1, the management controller further configured to calculate the health ranking based on at least one of status characteristics of the plurality of physical storage resources and identity characteristics of the plurality of physical storage resources.

3. The information handling system of claim 1, wherein the health ranking is further based on Self-Monitoring, Analysis and Reporting Technology (SMART) information for the physical storage resources.

4. The information handling system of claim 1, wherein the software-based controller comprises a software-defined storage controller.

5. The information handling system of claim 1, wherein the communication comprises input/output communication.

6. The information handling system of claim 1, wherein the software-based controller is further configured to redirect communication associated with a first physical storage resource of the plurality of physical storage resources indicated by the health ranking to have bad health to a second physical storage resource of the plurality of physical storage resources indicated by the health ranking to have better health than the first physical storage resource.

7. The information handling system of claim 1, wherein the software-based controller is further configured to communicate to the management controller which parameters of the environmental factors are to be used by the management controller to calculate the health ranking.

8. A method comprising:
receiving a health ranking of a plurality of physical storage resources of an information handling system from a management controller of the information handling system, the health ranking calculated by the management controller based on environmental factors associated with the plurality of physical storage resources, wherein the environmental factors include environmental factors relating to temperature, and wherein the health ranking includes a predictive indication of failure; and
redirecting communication associated with the plurality of physical storage resources based on the health ranking such that communication is redirected away from physical storage resources that have been predicted to fail.

9. The method of claim 8, wherein the health ranking is further based on at least one of status characteristics of the plurality of physical storage resources and identity characteristics of the plurality of physical storage resources.

10. The method of claim 8, wherein the health ranking is further based on Self-Monitoring, Analysis and Reporting Technology (SMART) information for the physical storage resources.

11. The method of claim 8, wherein the communication comprises input/output communication.

12. The method of claim 8, further comprising redirecting communication associated with a first physical storage resource of the plurality of physical storage resources indicated by the health ranking to have bad health to a second physical storage resource of the plurality of physical storage resources indicated by the health ranking to have better health than the first physical storage resource.

13. The method of claim 8, further comprising communicating to the management controller which parameters of the environmental factors are to be used by the management controller to calculate the health ranking.

14. An article of manufacture comprising:
a non-transitory computer-readable medium; and
computer-executable instructions carried on the computer-readable medium, the instructions readable by a processor, the instructions, when read and executed, for causing the processor to:
receive a health ranking of a plurality of physical storage resources of an information handling system from a management controller of the information handling system, wherein the health ranking is calculated by the management controller based on environmental factors associated with the plurality of physical storage resources, the environmental factors including environmental factors relating to temperature, and wherein the health ranking includes a predictive indication of failure; and
redirect communication associated with the plurality of physical storage resources based on the health ranking such that communication is redirected away from physical storage resources that have been predicted to fail.

15. The article of claim 14, wherein the health ranking is further based on at least one of status characteristics of the plurality of physical storage resources and identity characteristics of the plurality of physical storage resources.

16. The article of claim 14, wherein the health ranking is further based on Self-Monitoring, Analysis and Reporting Technology (SMART) information for the physical storage resources.

17. The article of claim 14, wherein the communication comprises input/output communication.

18. The article of claim 14, wherein the instructions are further configured to redirecting communication associated with a first physical storage resource of the plurality of physical storage resources indicated by the health ranking to have bad health to a second physical storage resource of the plurality of physical storage resources indicated by the health ranking to have better health than the first physical storage resource.

19. The article of claim 14, wherein the instructions are further configured to communicate to the management controller which parameters of the environmental factors are to be used by the management controller to calculate the health ranking.

* * * * *